United States Patent [19]

Izraelev et al.

[11] Patent Number: 4,654,735
[45] Date of Patent: Mar. 31, 1987

[54] LATCH FOR HEAD POSITIONING ACTUATOR FOR DISC FILES

[75] Inventors: Valentin Izraelev, Mountain View; Dimitri D. Scherlizin, Cupertino, both of Calif.

[73] Assignee: Ampex Corporation, Redwood City, Calif.

[21] Appl. No.: 671,142

[22] Filed: Nov. 13, 1984

[51] Int. Cl.[4] ............... G11B 19/22; G11B 25/04
[52] U.S. Cl. ........................... 360/104; 360/105
[58] Field of Search ................. 360/104–106, 360/98

[56] References Cited

U.S. PATENT DOCUMENTS

| 3,518,651 | 6/1970 | Keeney | 360/75 |
|---|---|---|---|
| 4,139,874 | 2/1979 | Shiraishi | 360/75 X |
| 4,164,769 | 8/1979 | Kaseta et al. | 360/106 |
| 4,188,648 | 2/1980 | Guerini | 360/105 |
| 4,331,989 | 5/1982 | Viskochil | 360/98 X |
| 4,484,241 | 11/1984 | Brende et al. | 360/105 |
| 4,538,193 | 8/1985 | Dimmick et al. | 360/103 X |
| 4,562,500 | 12/1985 | Bygdnes | 360/105 |

Primary Examiner—Stuart N. Hecker
Assistant Examiner—Alyssa H. Bowler
Attorney, Agent, or Firm—Charles M. Carman; Harry G. Thibault; Joel D. Talcott

[57] ABSTRACT

A latch for the pivoting head arm of a data-storage magnetic disc machine, in which a U-shaped latching member is arranged to avoid malfunctioning to block the movement of the arm, and may be operated entirely by means of a toggle spring, or entirely by means of a magnetic arrangement or cooperatively with both.

8 Claims, 6 Drawing Figures

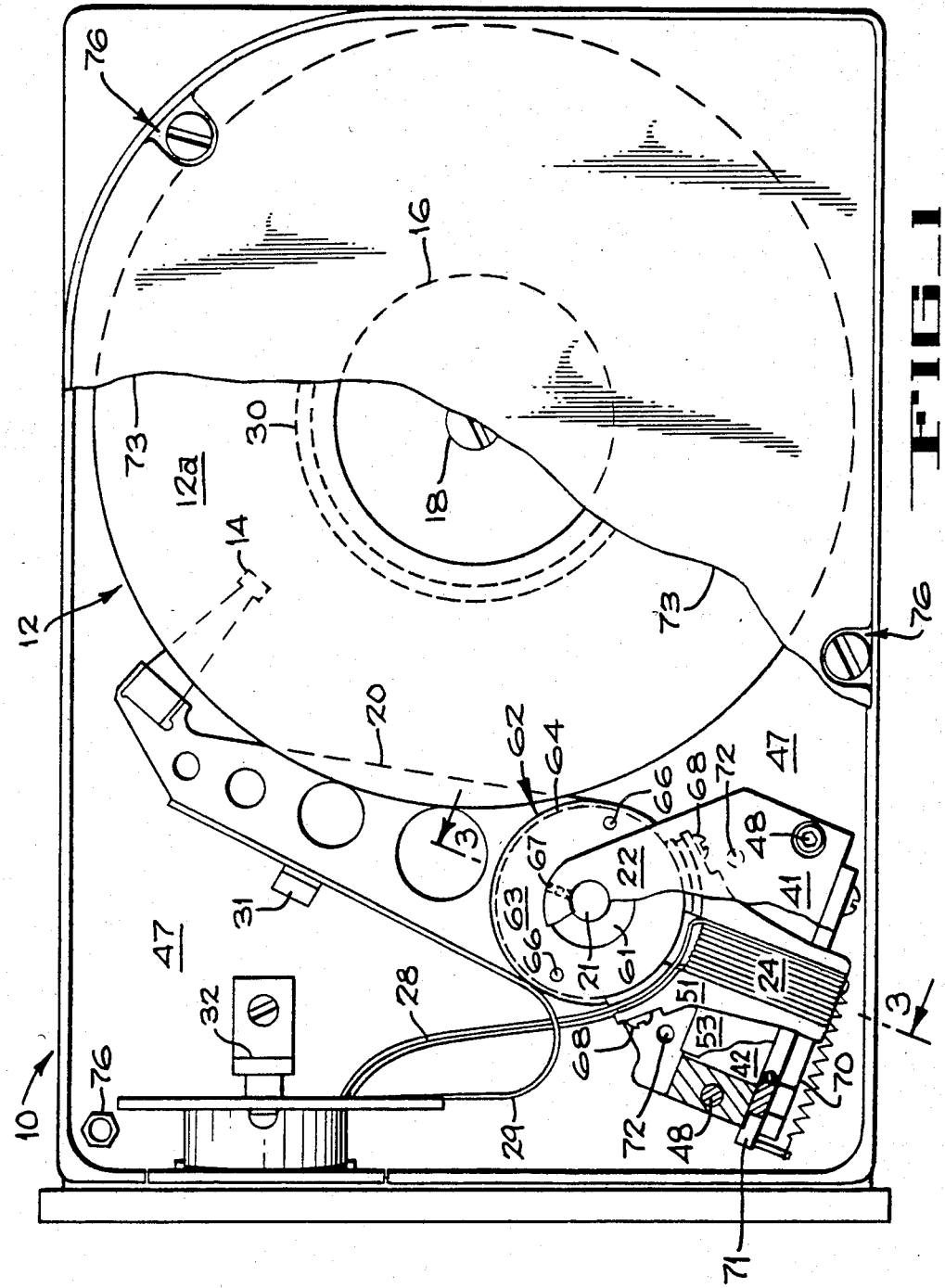
FIG_1

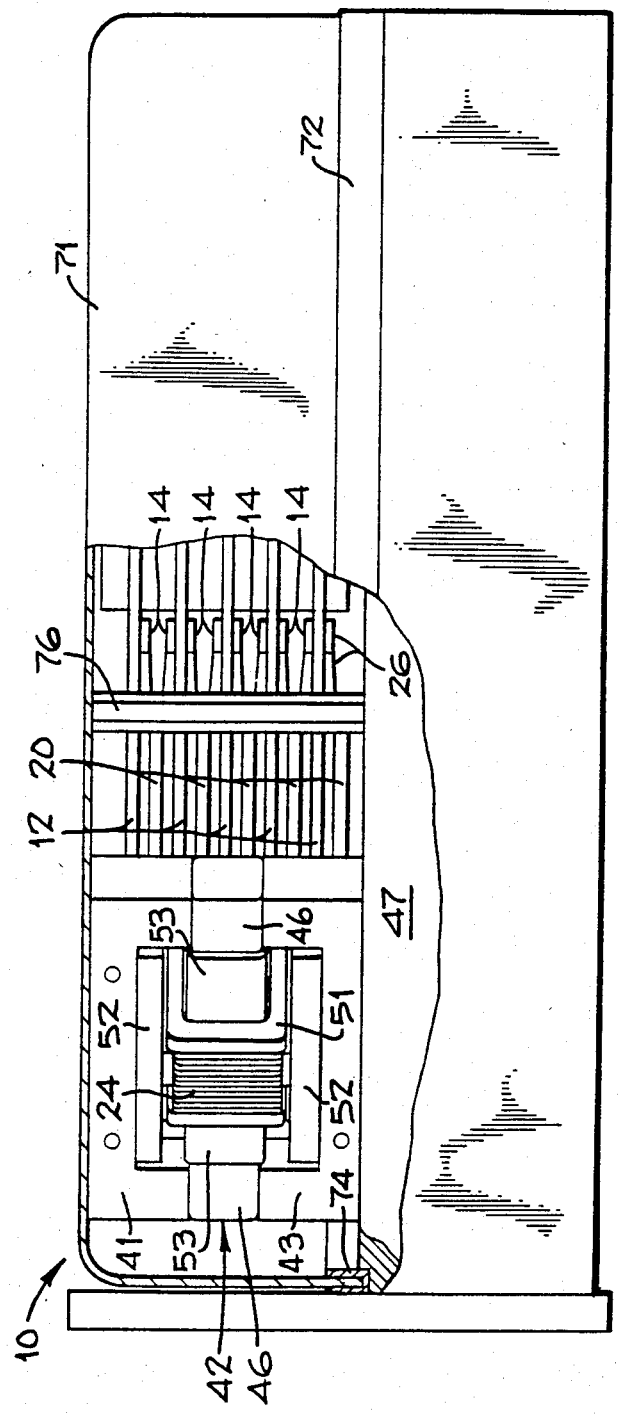
FIG_2
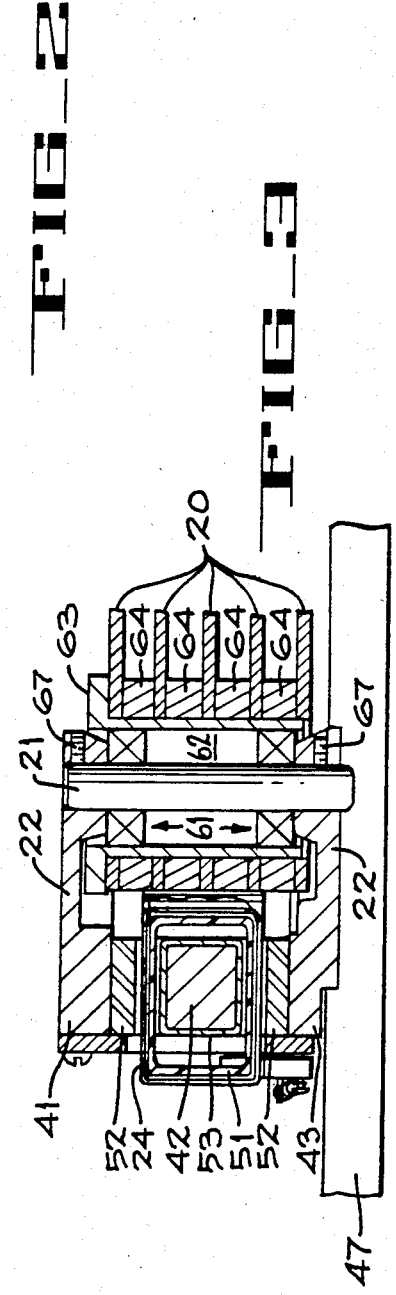
FIG_3

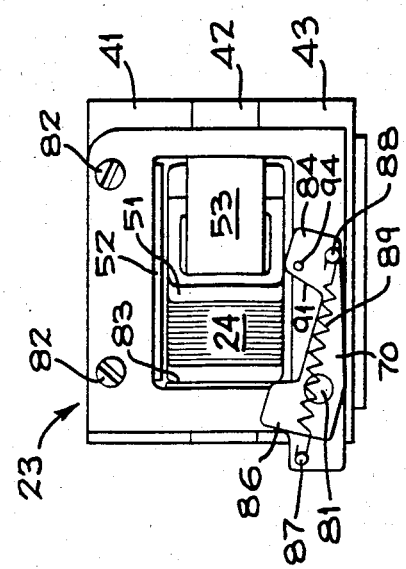
FIG_5
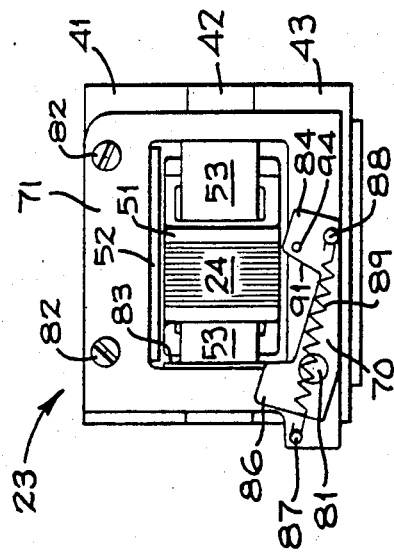
FIG_4
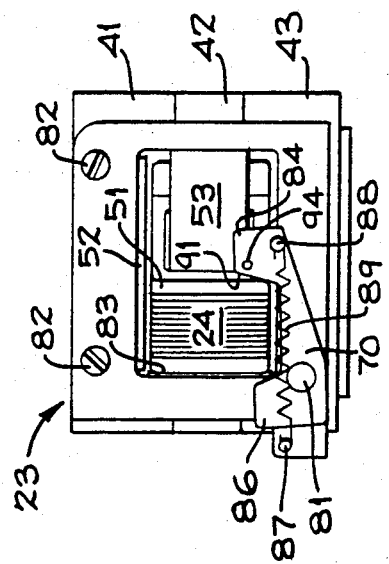
FIG_6

LATCH FOR HEAD POSITIONING ACTUATOR FOR DISC FILES

This invention relates to head positioning actuators for disc files, and particularly to latches for such actuators mounted for pivoting operation.

BACKGROUND OF THE INVENTION

Disc files of the so-called "Winchester" type are often provided with one or more magnetic transducing heads mounted on pivoting arms so that each head sweeps an arc extending generally radially of the rotating magnetic recording disc, and traces circular "tracks" thereon.

High density recording, and the reading of it, are both easily frustrated by the presence of specks of dust or debris; therefore the apparatus is usually contained within a hermetically sealed housing, which raises a requirement for completely automatic operation of the mechanical parts of the interior apparatus, in response to electrical signals from outside, once assembly has been completed and the apparatus leaves the factory.

One complication of the hermetic sealing of the apparatus is the difficulty of preventing damage to the interior structure when the power is shut off and the apparatus is being moved or transported. When subjected to jars, shocks or vibration, the pivoting arms may pivot and whip around, damaging the extremely delicate magnetic transducing heads at the arm ends, and the thin magnetic surfaces of the discs engaged by the heads. Ordinarily one would provide a manual battening means or latch for such occasions, but the difficulties of operating such latches remotely and automatically are great.

Previously in the art, it has been customary to provide a "fail-safe" energizing means for the voice coil motor that position-drives the head arms, such as a charged condenser that is controlled to discharge, upon failure of the normal operating voltage, so as to drive the arm motor to one extreme of its operating range, where a latch may be engaged. One form for such a latch may be the well-known door-latch in which a centrally pivoting U-shaped member is toggled to open its "U" to the door-edge as the latter closes, whereupon the door strikes the far arm of the "U" and pivots it over dead-center to bring the other arm of the member into retaining position to hold the door closed.

Unfortunately, as experienced door-operators well know, if such a U-shaped member is moved accidently to closed position while the door is still open, then the door is blocked from closing and can never be latched again, without manual intervention. But such intervention would be impractical in the hermetically sealed environment of the present invention.

Another difficulty with such a latch, for use in a disk-drive environment, is that the fail-safe driving impetus is of limited strength and duration, so that the latch inventor is under constraint to keep the U-member as close to the dead-center of the toggle spring as may be possible, while the latch is open, without permitting it to be moved over-center toward closed position under the influence of external shock or vibration.

OBJECT OF THE INVENTION

Accordingly, it is an object of the present invention to provide an automatically operating latch for the pivoting head arms of a data disc file apparatus.

It is another object of the invention to provide such a latch operating with hair-trigger precision and upon application of the lightest and most delicate of fail-safe actuation forces, to securely latch the pivoting head arm assembly in a desired power-off position.

It is a further object of the invention to provide a latch as above described, that is yet substantially immune to being moved toward closed position upon application of forces other than the above-described fail-safe actuating forces.

SUMMARY OF THE INVENTION

These and other objects are achieved in the present invention by the provision of a magnetically aided U-shaped and toggle-spring operated latch cooperating with permanent magnet means, already present as part of the voice-coil motor structure, to hold and/or return the latch to a fully-open position if forces are applied to the latch tending to close it while the head arm is not in its fail-safe power-down position.

DESCRIPTION OF THE DRAWINGS

FIG. 1 is a plan view of a disc-drive in accordance with the present invention, broken away in parts for greater clarity of illustration;

FIG. 2 is a broken-away elevation view, to the same scale, of the apparatus shown in FIG. 1;

FIG. 3 is a fragmentational cross-section view taken along the plane of lines 3—3 of FIG. 1;

FIG. 4 is an elevational view illustrating the invention in one position of operation;

FIG. 5 is an elevational view illustrating the invention in another position of operation; and FIG. 6 is an elevational view illustrating the invention in still another position of operation.

DESCRIPTION OF THE APPARATUS EMBODYING THE INVENTION

Referring now to FIG. 1, there is shown a disc drive 10 comprising a number of coaxially mounted discs 12, each having upper and lower magnetic writing surfaces 12a, and a number of magnetic transducing heads 14.

The discs 12 are mounted for rotation on a hub 16, which rotates on a spindle 18 and forms the rotor of a disc-drive motor of a type well-known in the art and not here further described.

As usually practiced in the art, the heads 14 are cantilevered at the tips of L-shaped support arms 20, which pivot about a shaft 21 parallel to the spindle 18 of the discs so that each head 14 may be caused to describe an arc across the adjacent disk surface 12a, this arc being generally directed in a radial direction of the disc. The pivoting of the arms 20 usually takes place in discrete jumps so that each head writes and reads information on a set of concentric circular tracks on its disc. In accordance with the present invention the pivoting shaft 21 for the assembly of arms 20 is mounted between a pair of trunnions 22, better shown in FIG. 3, extending from a fixed magnetic assembly 23 (see FIGS. 4–6) that serves as part of a voice-coil motor for the arms 20, the coil 24 of the motor being mounted at the end of the arms 20 assembly remote from the heads 14. Also as shown in FIG. 2, the bottom surface of the lowermost disc 14 is engaged by a servo control head 26, and flexible leads 28 and 29 extend to the coil 24 and to the heads 14, respectively. Also shown in FIG. 1 is an innermost track 30, termed a "landing zone", to which the heads should all be moved when power is shut off and the apparatus ceases operating. A resilient pad 31 for the arm 20 assembly (FIG. 1) is positioned to engage a stop 32 mounted on the base plate 47.

The massive, compact and unitary construction of the combined magnet structure and pivot shaft 21 is best illustrated in FIGS. 2 and 3, and a plan of portions of the construction is shown in the broken-away portions of FIG. 1:

A figure-eight arrangement of the magnet yokes includes an upper horizontal yoke bar 41, a central horizontal yoke bar 42 and a lower horizontal yoke bar 43. All three yokes are formed of a magnetically permeable material. The upper and lower yokes 41, 43 are formed as C-shaped members concavely confronting the central yoke 42 and sandwiching the end portions 46 thereof; the three-part assembly is assembled on a massive base plate 47 and is retained together and to the base plate by means of two vertically extending bolts 48. The reason for the three-part yoke construction is to enable the factory assembly of the yokes in linked relation to the one-piece annular form 51 which is formed of electrically insulating material, and which extends from the assembly of head arms 20 and circumvallates the yoke 42. The actual permanent magnets 52 of the voice coil motor are attached, as by means of epoxy cement, to the confronting sides of the upper and lower yokes 41, 43 and a one-turn shorted coil 53 of copper, e.g., (well-known in the art) is wrapped around the central yoke 42 directly circumvallating the yoke between the yoke and voice coil.

The trunnions 22 for the head arm pivot shaft 21 are not formed, as is usual in the art, as a separate construction arising from the base plate 47, but instead are formed integrally with the upper and lower yokes 41, 43, respectively, and particularly so that the combined yokes and trunnions 41-22 and 43-22 each have a C-shaped elevation profile taken along the length direction of the arms 20 (as shown in FIG. 2) but have an L-shaped elevation profile as taken orthogonally to the arm 20 length direction, as shown in FIG. 3. The pivot shaft 21 has press-fitted thereon a pair of ball-bearing races 61, also press-fitted into a hollow cylindrical hub 62 having an upper flange 63 against which are spindled the stack of arms 20 with intervening spacers 64, the assembly being held together by a pair of bolts 66 (FIG. 1) threaded into the flange 63. A pair of set screws 67 retain the shaft 21 in fixed relation to the trunnions 22. The coil 24 as attached to a form 51 which is bolted to a pair of the spacers 64 by suitable bolts 68 (FIG. 1). The magnet and pivot arm assembly is attached to base plate 47 by means of two bolts 72 threaded from beneath.

DETAILED DESCRIPTION OF THE PREFERRED EMBODIMENT

Also shown in FIGS. 1 and 3-6, but not shown in FIG. 2 for greater clarity of illustration, is a spring-loaded latch element 70 and mounting frame 71 therefor, suitable for latching the coil and arm assembly in an inoperative position when power is shut off, and with the heads 14 all engaging the "landing zone" tracks 30 pertaining thereto.

As previously discussed, one of the requirements for a latch in the hermetically sealed environment of the present invention is that it must operate entirely automatically and in response to electrical signals from the outside, never requiring manual intervention to aid or correct the functioning of the device, this hermetically sealed environment being established by a housing cover 73 having a sealing gasket 74, and the cover being attached by means of bolts threaded into stand-off posts 76 extending from base plate 47.

Accordingly, the latch element 70 of the invention is formed as a U-shaped member pivoted as by a screw-pin 81 to the frame 71 and serving, along with a pair of bolts 82, to secure the frame 71 on the magnet yoke assembly 41-43. The frame 71 is recessed at the left side to seat a resilient stop pad 83 for cushioning the coil form 51 at the left end of its pivoting traverse.

FIG. 4 shows the coil form 51 in a normal operating position, and it will be noted that no matter how far to the right (as seen in the FIGURE) the coil form moves, it never can clear a latching detent portion 84 of the latch 70, so as to trap the detent 84 in a raised position (see FIG. 6). If the coil form 51 were to the right (as seen in the FIGURE) of the detent 84, such as arrangement would permanently block the return of the coil form 51 and require dis-assembly of the housing and manual intervention. Thus one hazard associated with the U-shaped latch, as previously known in the art, is avoided.

FIG. 5 illustrates the "trigger" or "intermediate" position of the coil form 51 and latch 70, in which the form 51 has been moved toward its left-most position, as by the fail-safe operation of a charged capacitor energizing the coil 24 as previously known in the art or as by energization of the coil current generated by a spindle motor 16 (FIG. 1) coasting to a halt whenever the power is shut off or fails at the end of or during operation.

In moving left-ward, the coil form 51 engages a trigger detent portion 86 of the latch 70 and moves it through the "intermediate" position of the latch, corresponding to a position at which the pivot pin 81 of the latch falls on a straight line between a fixed pin anchor 87 and a latch pin anchor 88 for a toggle spring 89, this alignment being also termed the "center" position at which the spring exerts no resultant force urging the latch to pivot in either direction. Once moved in an anti-clockwise direction from the center or intermediate position, however, the spring 89 urges the latch 70 to the latching position illustrated in FIG. 6, in which the latching detent 84 obtrudes into the path of relative movement of the coil form 51 with respect to the magnet assembly 23 to block such movement and retain the coil form 51 in the latching position against ordinary jarring and external shock forces, and particularly until the coil 24 is once again energized with current properly directed to cause movement of the coil to the right (as seen in the FIGURE) in the magnetic field established by the permanent magnets 52.

It will be seen that the latching detent 84 has an inclined cam face 91, and that the lever arm between the detent 84 and pivot pin 81 is much greater than the lever arm between pin 81 and trigger detent 86; also that the line of spring 89 (between pins 87, 88) is only very slightly "over-center" for the latching position illustrated in FIG. 6. These parameters, together with the spring force of spring 89, are carefully chosen so that the resultant latching force against coil form 51 is great enough not to be overcome by jolts or shocks of ordinary force, but small enough to be readily overcome by the forces generated in the coil 24 when it is energized to move rightwardly during normal head-positioning operation.

Thus, upon such energization, the coil 51 moves to normal operation position as shown in FIG. 4.

In FIG. 4 the latch is only just barely discernable to be further clockwise than it is in the intermediate or toggle-centered position of FIG. 5. This very slight displacement from the toggle-centered position is intended to provide a "hair-trigger" effect, such that the coil form 51 needs only to barely touch and to very slightly displace (to the left) the trigger detent 86, as the coil moves leftwardly under the light and transitory impetus given thereto by the "fail-safe" energization of the coil when the normal operating power fails or is shut off.

However, to maintain the latch 70 in the trigger position (FIG. 4), so near to the toggle-centered intermediate position (FIG. 5) without entertaining the hazard of external shocks and vibrations urging the latch anticlockwise and over-center to crash into or rub against the bottom surface of the coil, when the coil is in the operating range of positions (FIG. 4), something beyond the expedients previously known in the art need to be employed.

Accordingly, the present invention takes advantage of the presence of the lower permanent magnet 52 to aid in holding the latch 70 in the unlatched position (FIG. 4), in which position the spring 89 has almost negligible resultant force applicable to hold the latch against anticlockwise urging shocks or vibrations.

In pursuit of this end, the latch element 70 is made of magnetically non-permeable and non-magnetic material so as not to be influenced by the magnets 52, and a magnetically permeable (or a magnetic, suitably oriented) pin 94 is inserted in the detent 84 portion of the latch, in just the right place to be drawn toward and to the lowermost magnet 52 when the latch is in the unlatched position (FIG. 4).

Thus, the latch is very strongly stabilized and restrained against leaving the unlatched position under ordinary external shocks, yet the retention force of the magnet 52 is easily overcome by the movement of the coil form 51 leftward to bring the latch over the center position (FIG. 5) and to a position in which the spring 89 begins to urge the latch toward the latching position (FIG. 6). Meanwhile, as the latch moves away from the unlatching position, the attraction force of magnet 52 on the pin 94 drastically decreases.

It will be apparent that the structure described has an additional "fail-safe" feature, in that if the spring 89 breaks during operation the latch will still continue to function, although there will be occasional rubbing of the tip of detent 84 along the bottom of the coil 24.

However, if the coil 24 is energized, upon initiation of operation, with sufficient impulsive acceleration, the detent 84 can be "kicked" beyond the position of FIG. 5, and even beyond the position of FIG. 4, to an "ultimate unlatched" position engaging the base plate 47 (see FIG. 3).

Consequently, the invention contemplates, as one of its forms, a latch that operates entirely by physical contact of the coil together with magnetic retention means, and entirely without a toggle spring.

Thus there has been described a latch for the pivoting head arm of a data-storage magnetic disc machine, in which a U-shaped latching member is arranged to avoid malfunctioning to block the movement of the arm, and may be operated entirely by means of a toggle spring, or entirely by means of a magnetic arrangement or cooperatively with both.

What is claimed:

1. A latching mechanism for an actuating mechanism for a head support arm of a disk drive assembly, said arms having relative movement along a predetermined path between two limits associated with the movement of a head across a disk surface, comprising:
   a latching member mounted on said actuating mechanism for movement between latching, intermediate and unlatching positions;
   said latching member being formed with a latching detent portion obtruding into said path to block said relative movement in the latching position but freeing said path in the unlatching position;
   said latching member also having a trigger detent portion obtruding into said path in the unlatching position so as to be engaged and actuated by the actuating mechanism to cause said movement of the latching member to the latching position;
   said latching member being provided with a spring means mounted for aiding the movement of said latching member toward each of said latching and unlatching positions from said intermediate position thereof; and
   said actuating mechanism, during said movement between said limits and while spaced from said trigger detent portion, obtruding continuously in the path of said latching detent portion so as to prevent said latching member from moving to the latching position except when actuated to do so by engagement of said trigger detent portion by said actuating mechanism.

2. A latching mechanism as described in claim 1 wherein said latching member and at least a portion of said actuating mechanism is formed at least in part of magnetic materials exerting an unlatching-aiding force of increasing magnitude as said latching member moves away from said latching position and toward said unlatching position.

3. A latching mechanism for a pivoting head arm of a magnetic disk drive in which a portion of said arm moves along a predetermined path associated with the movement of a head across a disk and between two limits, comprising:
   a latching member mounted on said magnetic disk drive for movement between latching, intermediate and unlatching positions;
   said latching member being formed with a latching detent portion obtruding into said path to block said arm in the latching position but feeing said path in the unlatching position;
   said latching member also having a trigger detent portion obtruding into said path in the unlatching position so as to be actuated by the head arm to cause said movement of the latching member to the latching position;
   said latching member being provided with a toggle spring mounted for aiding the movement of said latching member toward each of said latching and unlatching positions from said intermediate position thereof; and
   said arm portion, during movement between said limits and while spaced form said trigger detent portion, obtruding continuously in the path of said latching detent portion so as to prevent said latching member from moving to the latching position except when actuated to do so by engagement of said trigger detent Portion by said arm portion.

4. A latching mechanism as described in claim 3 wherein said latching member has a portion formed of magnetically permeable material and said disk drive is formed at least in part of magnetic material arranged to exert an unlatching-aiding force of increasing magnitude as said latching member moves away from said latching position and toward said unlatching position.

5. A magnetically operable latching mechanism for an actuating mechanism for a held support arm of a disk drive assembly, said arm having relative movement along a predetermined path associated with the movement of a head across a disk, comprising:
- a latching member mounted on said actuating mechanism for movement between latching, intermediate and unlatching positions;
- said latching member being formed with a latching detent portion obtruding into said path to block said relative movement in the latching position but freeing said path in the unlatching position;
- said latching member also having a trigger detent portion obtruding into said path in the unlatching position so as to be actuated by the actuating mechanism to cause said movement of the latching member to the latching position;
- said latching member and at least a portion of said actuating mechanism being formed at least in part of the magnetic materials exerting an unlatching-aiding force of increasing magnitude as said latching member moves away from said intermediate position and toward said unlatching position.

6. A latching mechanism as described in claim 5 wherein said latching member is provided with a toggle spring mounted for aiding the movement of said latching member toward each of said latching and unlatching positions from said intermediate position thereof.

7. A magnetically operable latching mechanism for a pivoting head arm of a magnetic disk drive in which a portion of said arm moves along a predetermined path associated with the movement of a head across a disk surface, comprising:
- a latching member mounted on said magnetic disk drive for movement between latching, intermediate and unlatching positions;
- said latching member being formed with a latching detent portion obtruding into said path to block said arm in the latching position but freeing said path in the unlatching position;
- said latching member also having a trigger detent portion obtruding into said path in the unlatching position so as to be actuated by the head arm to cause said movement of the latching member to the latching position;
- said latching member having a portion formed of magnetically permeable material and said disk drive being formed at least in part of magnetic material arranged to exert an unlatching-aiding force to increasing magnitude as said latching member moves away from said intermediate position and toward said unlatching position.

8. A latching mechanism as described in claim 7 wherein said latching member is provided with a toggle spring mounted for aiding the movement of said latching member toward each of said latching and unlatching positions from said intermediate position thereof.

* * * * *